(12) United States Patent
Yu et al.

(10) Patent No.: US 8,065,310 B2
(45) Date of Patent: Nov. 22, 2011

(54) TOPICS IN RELEVANCE RANKING MODEL FOR WEB SEARCH

(75) Inventors: Qing Yu, Beijing (CN); Jun Xu, Beijing (CN); Hang Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 400 days.

(21) Appl. No.: 12/146,430

(22) Filed: Jun. 25, 2008

(65) Prior Publication Data

US 2009/0327264 A1 Dec. 31, 2009

(51) Int. Cl.
*G06F 17/30* (2006.01)
(52) U.S. Cl. .......................... 707/748; 707/723
(58) Field of Classification Search .................. 707/723, 707/748
See application file for complete search history.

(56) References Cited

U.S. PATENT DOCUMENTS

| | | | |
|---|---|---|---|
| 7,260,568 B2 | 8/2007 | Zhang et al. | |
| 2006/0136411 A1 | 6/2006 | Meyerzon et al. | |
| 2007/0150473 A1 | 6/2007 | Li et al. | |
| 2007/0162448 A1 | 7/2007 | Jain et al. | |
| 2007/0185865 A1 | 8/2007 | Budzik et al. | |
| 2007/0266022 A1 | 11/2007 | Frumkin et al. | |
| 2007/0288514 A1 | 12/2007 | Reitter et al. | |
| 2009/0240680 A1* | 9/2009 | Tankovich et al. | 707/5 |
| 2009/0259651 A1* | 10/2009 | Tankovich et al. | 707/5 |
| 2009/0265338 A1* | 10/2009 | Kraft et al. | 707/5 |

OTHER PUBLICATIONS

Westerveld, et al., "REtrievingWeb Pages using Content, Links, URLs and Anchors", In The Tenth Text Retrieval Conference (TREC), 2001, pp. 1-10.
Mishne, et al., "Boosting Web Retrieval through Query Operations", vol. 3408, 2005, Springer Berling / Heidelberg, pp. 15.
Zhang, et al., "An Efficient Algorithm to Rank Web Resources", In Proceedings of the 9th International World Wide Web Conference, May 2000, pp. 10.
Gudivada, et al., "Information Retrieval on the World Wide Web", IEEE Internet Computing, IEEE,1997, pp. 58-68.

* cited by examiner

*Primary Examiner* — Khanh Pham
*Assistant Examiner* — Johnese Johnson
(74) *Attorney, Agent, or Firm* — L. Alan Collins; Collins & Collins Incorporated

(57) ABSTRACT

Described is a technology by which topics corresponding to web pages are used in relevance ranking of those pages. Topics are extracted from each web page of a set of web pages that are found via a query. For example, text such as nouns may be extracted from the title, anchor texts and URL of a page, and used as the topics. The extracted topics from a page are used to compute a relevance score for that page based on an evaluation of that page's topics against the query. The pages are then ranked relative to one another based at least in part on the relevance score computed for each page, such as by determining a matching level for each page, ranking pages by each level, and ranking pages within each level. Also described is training a model to perform the relevance scoring and/or ranking.

16 Claims, 5 Drawing Sheets

TOPICS IN RELEVANCE RANKING MODEL FOR WEB SEARCH

BACKGROUND

In web searches, a user wants the most relevant results (e.g., a list of links ranked by relevance) returned in response to a query. Traditionally, relevance has been represented by conventional models such as BM25, language modeling for information retrieval, proximity modeling, and so forth.

However, results returned in response to a web search that uses one of these conventional models are not always the most relevant. Even when the most relevant material is returned among a list of URLs, links are often not properly ranked by relevance. Any mechanism that can return more relevant results and/or ranks relevant results relative to one another according to relevance is valuable in web search technology.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which topics corresponding to web pages are used in relevance ranking of those pages. In one aspect, topics are extracted from each web page of a set of web pages that correspond to a query. For example, text such as nouns may be extracted from the title, anchor texts and URL of a page, and used as the topics.

The extracted topics for each page are used to compute a relevance score for that page based on an evaluation of that page's topics against the query. The pages are then ranked relative to one another based on the relevance score computed for each page, such as by determining a matching level for each page, ranking pages by each level, and ranking pages within each level.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards using topics associated with a web page as a way of representing relevance. To this end, there is described a model referred to herein as "topic match." In topic match, each web page is associated with certain topics presented in the title, URL, anchor texts, body, tags; the relevance of the page with respect to the query can be represented by the matching degree between the query and the topics automatically extracted from the data of the page.

While many of the examples described herein are directed towards five levels of matching, it is understood that any reasonable number of levels may be used. Further, in one simplified example the topics are extracted only from the title, anchor and URL, however it is understood that not all three need be used, or that additional and/or other topics may be used. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing are web searching in general.

Figure 1:
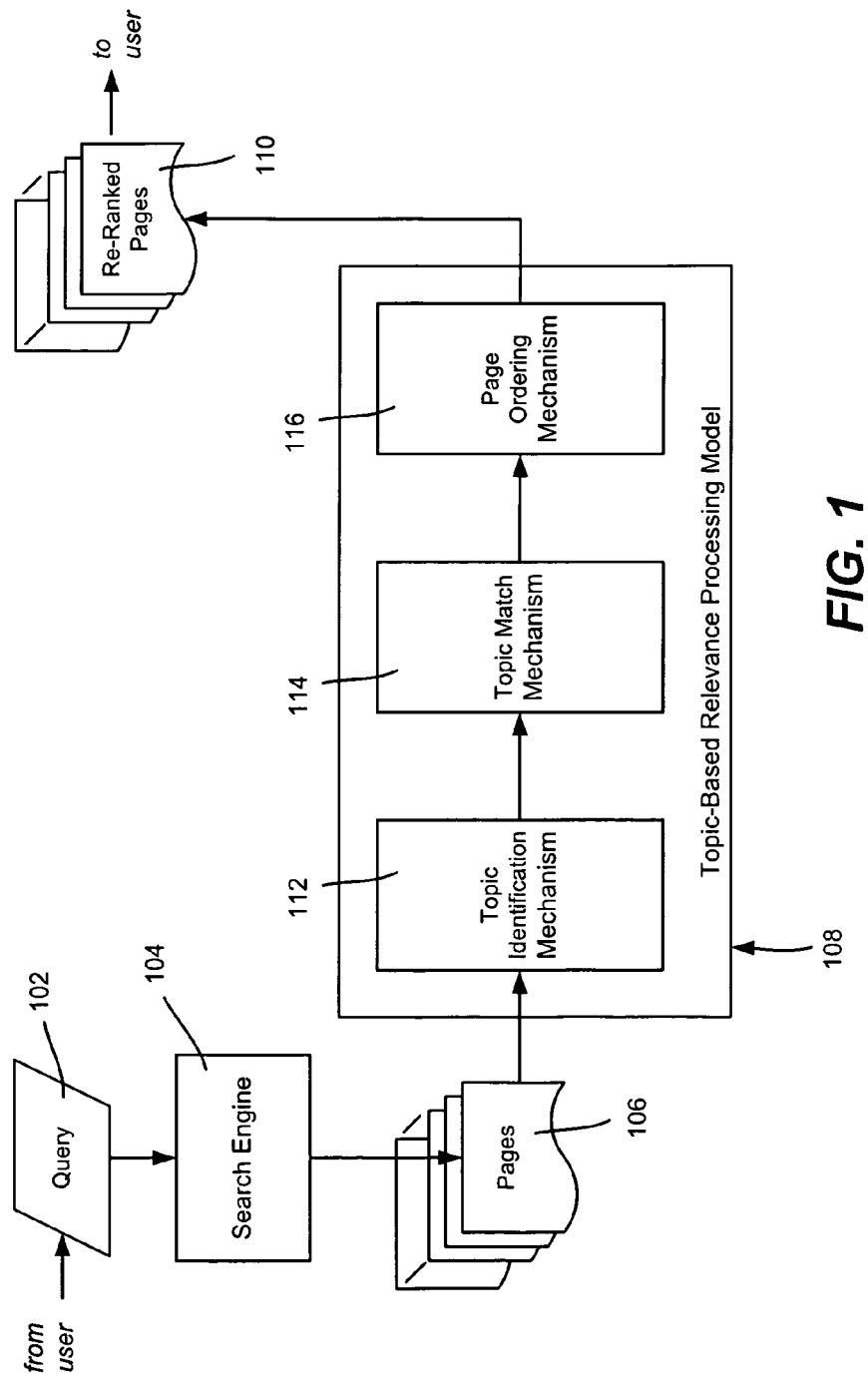
FIG. 1 is a block diagram representing example components in a search environment including a mechanism for re-ranking pages based on topic-based relevance scores.

Turning to FIG. 1, there is shown a general block diagram representing the extraction of topics from web pages, and the use of topic matching to rank pages based in part on a topic-dependent relevance score. To this end, when a user submits a query 102, a search engine 104 obtains a number of pages 106. As described below, a topic-based relevance processing mechanism 108 re-ranks those pages, at least in part based on topic data, into a re-ranked set of pages 110. Note that the total number of input pages 106 that are further processed herein for topic-based relevance may be some limited number, e.g., the top N are further processed for relevance-based ranking or re-ranking. An alternative method is that the system can retrieve all results for re-ranking; however this tends to have very low efficiency.

In general, for each page, a topic identification mechanism 112 extracts topics from that web page's title, anchor and URL. Topics are typically the noun phrases representing the subjects of a web page, and may be found from the title, anchor texts, URL, tags assigned to the web page, and queries associated with the web page. Topics may also be found in the body of a page, particularly within the main block of the page. Topics can be synonyms of each other; they can also be related terms.

Thus, the topic identification mechanism 112 attempts infer the topics of a web page from some or all of the data sources of the page. Topic candidates may be selected across different data sources, majority or weighted voting on the candidates may be used, and so forth to identify the most salient topics. Note that using the information from multiple data sources allows for incomplete input data, e.g., even if data from some sources is missing, the information from the other sources is still available. Further, inferred topics will be more reliable, e.g., what are likely the important topics are boosted when they are identified from multiple sources. Still further, results will be more robust, e.g., even if one of the data sources is spammed, such as anchor texts, it is still possible to correctly identify the true topics of the page.

In one example implementation, the title, anchor, and URL were used for extracting the topics of web pages. For example, a rule-based system may be used to extract a topic from the title of the web page, and a top number (e.g., five) anchor texts with the highest frequencies are extracted as topics; (if less than that number are present, all are used). For example, if the title (i.e., the text within the title within the HTML document) is "Homepage of X", then "X" is taken as a topic. The system may also use the entire title as a topic.

The URL string may be segmented into Begin, Middle, and End parts in topic extraction. For example, the URL may be delineated by the slash symbol, such that Begin is the substring between "http://" and the first slash, End is the substring after the last slash, and Middle is the substring between Begin and End. These parts are ordered as Begin, End, and Middle, with further segmenting of each part into words, discarding stopwords (e.g., "edu", "org") and heuristically viewing the obtained pseudo-text as a topic.

By way of example, if the URL is "http://en.abcdefg.org/hijk/Data_mining", then the topic "en abcdefg data mining hijk" is obtained. In this way, to seven topics from a web page may be identified in this simplified example. Note that some of the extracted topics might be synonyms with each other (e.g., "Microsoft", "MS", "Microsoft Corporation"); there may be viewed as different topics, or alternatively merged in some way (e.g., via a dictionary).

The system also supports extracting topics from the body text of a web page. For example, the system first splits the body text by sentence, and treats each sentence as a topic. Based upon experience, this helps improve the accuracy of relevance computation at the expense of (possibly very large) computation time.

Given the topics of a web page, further processing by the topic match mechanism 114 defines a degree of matching between those topics and the query, which is then used as a relevance score. To determine how well the query matches with the topics of the page, the surface level agreement between the query and topics may be evaluated. Because queries usually represent the topics of the pages for which users search, the degree of the matching is a very strong indicator of relevance.

Figure 2:
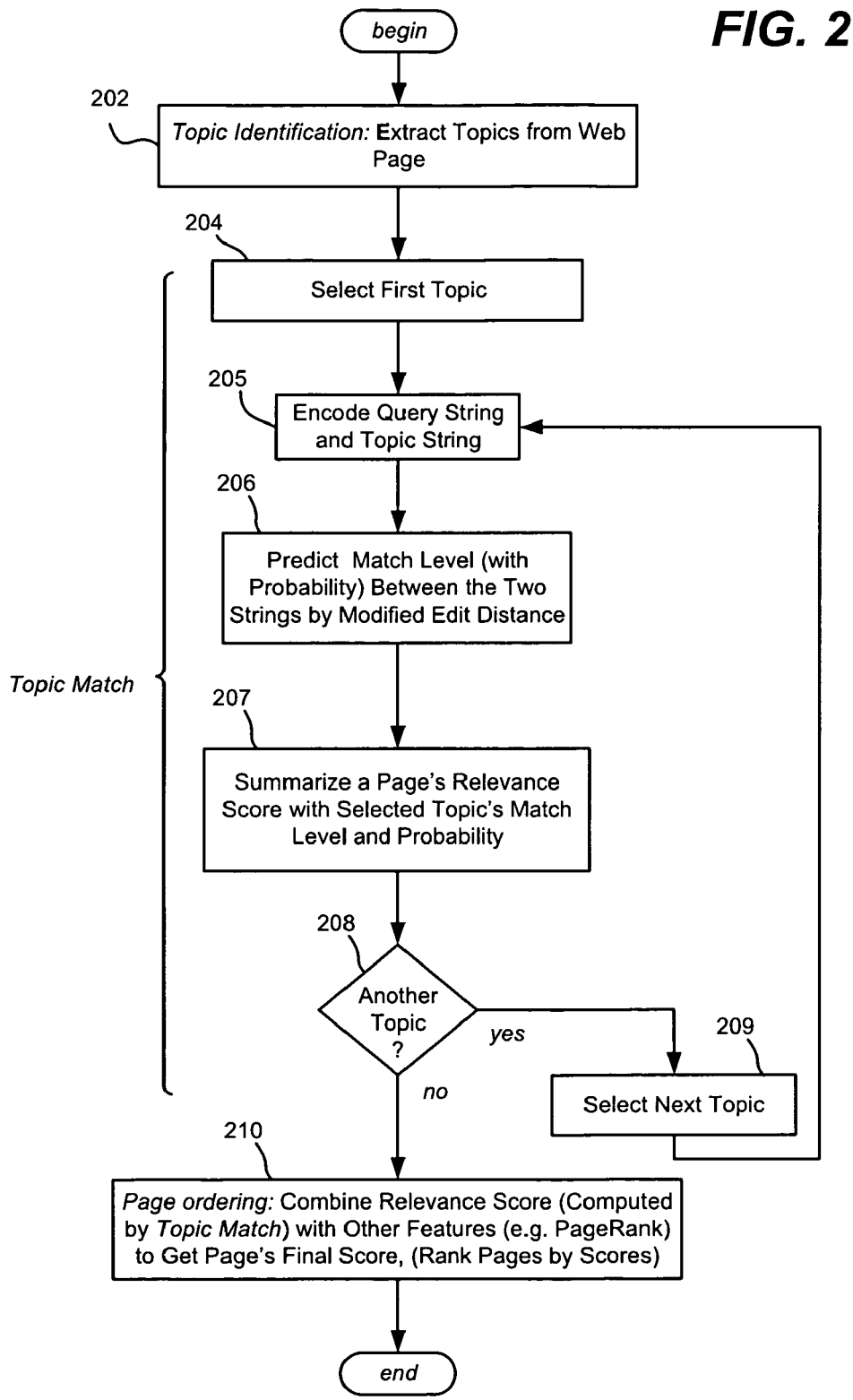
FIG. 2 is a flow diagram showing example steps taken to compute and re-rank pages based on topic-based relevance scores.

FIG. 2 summarizes general example operations of topic matching, following top extraction at step 202. Via steps 204-209, the topic match mechanism 114 computes a relevance score for each topic extracted from a page. To this end, the mechanism 114 encodes the query string and topic string as described below. The mechanism predicts the match level (with probability) between the two strings by a modified edit distance algorithm, also described below.

A page's relevance score is then applied via each topic's match level and probability. Step 210 represents another operation performed by a page ordering mechanism 116 (FIG. 1), namely combining the relevance score (computed by the topic match model) with other features (e.g. PageRank) to get a page's final score used in a final ranking of the pages. In this manner, the topic match's relevance determination may be combined with one or more traditional information retrieval methods to improve web search relevance scoring.

In one example implementation, there are five levels (L0-L4) of matching between a query and a topic. The table below shows examples of five such levels; (note that this table only shows one possible set of example level definitions; other level definitions and/or the number of levels may be used):

| L0: Exact match | Topic string and query string are exactly the same. | Query: computer science department<br>Topic: computer science department |
| --- | --- | --- |
| L1: Partial match (equivalent) | Topic string partially matches with query string. They have the same meaning. | Query: computer science department<br>Topic: department of computer science |
| L2: Partial match (relevant) | Topic string partially matches with query string. The topic is relevant to the query | Query: computer science department<br>Topic: computer science department |
| L3: Partial match | Topic string partially matches with query | Query: computer science<br>Topic: computer sales |
| (irrelevant) | string. However, there is no or weak relevance between them. | |
| L4: Non match | Topic string does not match with query string. | Query: computer science<br>Topic: world wide web |

For each level there is a conditional probability model $P(L|Q \rightarrow T)$, where L denotes a level and $Q \rightarrow T$ denotes an event of generating topic T from query Q. Given a query and a topic, the conditional probability may be calculated for each level, selecting the level that has the largest probability as that of matching between the query and the topic.

$$\operatorname*{argmax}_L P(L \mid Q \rightarrow T) = \operatorname*{argmax}_L P(L) P(Q \rightarrow T \mid L)$$

In ranking, the documents are first ranked according to their levels, and within each level, the documents are ranked by their probabilities at that level.

If there are several topics extracted from a page, and each has one probability score match for each level, i.e., $P(L|Q \rightarrow T)$, then any number of ways may be used to combine the scores, e.g., by voting or linear combination. For example, if the title, anchors and URL are used as a basis for topic extraction, a linear combination may be used, e.g., the final score $S_{fin}$ is calculated as:

$$S_{fin} = w_1 \cdot P_{ttl} + w_2 \cdot P_{anc} + w_3 \cdot P_{url}$$

where $P_{ttl}$ is the probability score from title, $P_{anc}$ that from the anchor, and $P_{url}$ that from the URL. Note that in this example, $P_{anc}$ is the largest probability score among the five anchor probability scores.

As mentioned above, a model referred to as modified edit distance is used to model and solve the matching problem; that is, the topic match mechanism models the matching degree by means of a modified Edit Distance algorithm. More particularly, in one example implementation of a topic match model, the conditional probability of generating a topic from a query is calculated for a given level by using an edit distance model; there is an edit distance model defined for each level of matching, namely, $P(L|Q \rightarrow T)$.

In order to use edit distance, the query and topic string are encoded. With respect to encoding, in one example implementation, when generating topic T from query Q, the positions, occurrences, orders of the words in the topic and query string matter, rather than the particular contents of the words. This significantly reduces the complexity of the model. As a result, the mechanism 114 encodes the words into two strings with characters. To this end, a set of characters $S=\{a \ldots j\}$ and a set of complementary characters $\bar{S}=\{\bar{a}, \ldots, \bar{j}\}$ are used, along with two special characters: $\phi$ and $\epsilon$. Given a query string Q, the mechanism 114 represents the words in it using the characters $x \in S \cup \bar{S} = \{a, \ldots j, \bar{a}, \ldots \bar{j}\}$. The characters a, b, ..., j denote the first, second, and tenth words in the query string. If a word in the query string does not exist in the topic string, then the mechanism 114 replaces its character a ... j with the complementary character $\bar{a}, \ldots \bar{j}$. Here for simplicity, the model takes only the first ten query words for the computation.

Given topic string T, if a word in the topic string also exists in the query string, the corresponding characters a, b, ..., j of the query string are used to denote it. If a word in the topic string does not exist in the query string, then it is replaced with character $\phi$. The character $\epsilon$ denotes a null word in either query string or topic string. The mechanism 114 may then encode a pair of query and topic with a pair of character strings ($x^m$; $y^n$). Here m and n denote the numbers of words in the query string and topic string respectively.

The following sets forth two examples:
Query: machine learning
Topic 1: journal of machine learning
Encoded query-topic pair: (ab,$\phi\phi$ab).
Query: machine learning
Topic 2: learning information retrieval
Encoded query-topic pair: ($\overline{ab}\phi\phi$)

The model generation process comprises a number of operations, including skipping, insertion, and deletion. The operations of insertion and deletion have different costs defined. For insertion, there are two costs, namely inserting a word $y_j$ existing in the query and inserting a word $\phi_j$ not existing in the query; in the former case the word already exists at another position in the query string, while in the latter case the word does not exist in the query string (thus the cost should be higher). For deletion, there are also two costs, namely deleting a word $x_i$ temporarily and deleting a word permanently in the query; in the former case the word will still exist at another position in the topic string after deletion, while in the latter case the word will disappear from the topic string (thus the cost should be higher).

In skipping, if there is an exact match then the cost is zero. Further, the costs are position-sensitive, meaning that they depend on the positions on which the operations are performed. The following table sets forth additional details:

| Skipping | ($x_i$, $y_j$) | Skipping current position if $x_i = y_j$ |
| Insertion | ($\epsilon$, $y_j$) | Inserting topic word $y_j$ into query string with position i |
| Deletion | ($x_i$, $\epsilon$) | Deleting topic word $x_i$ from the position i |

More operation and cost definition can be added into the system to increase the match accuracy. For example, a substitution operation ($x_i$,$y_j$) may be defined, which means that the word in position i is replaced by the word in position j. The operation cost, for example, can be defined by a dictionary which maintains the syntax relationship between the two words.

By way of example, suppose that the query is "machine learning", and with the topics "learning experience" and "learning machine" generated from it. After deletion of "machine" and exact match of "learning", insertions of "experience" and "machine" are performed, with two different costs. This is because the former word does not exist in the query, while the latter word does. As a result, "learning machine" has a lower cost than "learning experience", which means that it is more relevant to "machine learning". Given the query Q denoted as $x^m$ and the topic T denoted as $y^n$, the Edit Distance between them is computed as Dist($x^m$; $y^n$) using Dynamic Programming:

$$M_{i,j} = \min \begin{cases} M_{i-1,j-1} + c_M(x_i, y_j) \\ I_{i-1,j-1} + c_M(x_i, y_j) \\ D_{i-1,j-1} + c_M(x_i, y_j) \end{cases}$$

$$c_M(x_i, y_j) = \begin{cases} 0 & \text{if } x_i = y_j \\ \infty & \text{if } x_i \neq y_j \end{cases}$$

-continued $$D_{i,j} = \min \begin{cases} M_{i-1,j} + c_D(x_i, \epsilon) \\ D_{i-1,j} + c_D(x_i, \epsilon) \\ I_{i-1,j} + c_D(x_i, \epsilon) \end{cases}$$

$$I_{i,j} = \min \begin{cases} M_{i,j-1} + c_I(\epsilon_i, y_j) \\ D_{i,j-1} + c_I(\epsilon_i, y_j) \\ I_{i,j-1} + c_I(\epsilon_i, y_j) \end{cases}$$

$$D(x^m, y^n) = \min(I_{m,n}, D_{m,n}, M_{m,n})$$

Matrix M represents the operation of skipping. Matrices D and I represent the operations of deletion and insertion respectively. $c_D(x_i,\epsilon)$ denotes the cost of deleting a query word $x_i$. $c_I(\epsilon_i,y_j)$ denotes the cost of inserting a topic word $y_j$ into query string at the position i. Both $c_D(x_i,\epsilon)$ and $c_I(\epsilon_i,y_j)$ are parameters of the model, which may be tuned using labeled data.

Thus, a total cost of generating the query to the topic may be calculated using dynamic programming. In general, the smaller the total cost, the larger the conditional probability of generating the topic from the query at the level.

With the use of the edit distance, topic match as described herein can naturally represent much information useful for determining relevance. For example, the order of words may be among the information for determining relevance, e.g., if two strings can approximately match with each other in the same order, then the two strings likely represent a similar topic, resulting in a higher level (or lower cost). As a more particular example, E.g., "department of computer science" matches "department of computer and information science" to an extent.

The distance (proximity) of two query words matched in the topic (or document) provides other useful information for deciding relevance. In topic match as described herein, a long distance between two matched query words in the topic string requires many insertions, and therefore a high total cost. For example, "machine learning" matches "machine aided teaching and learning" versus "machine learning" matches "machine performs learning".

Existence of words also may be considered, that is, whether a query word exists in the topic (or document). If a mismatch between the query string and the topic string occurs, then the mismatch caused by an existing word in the query or the mismatch caused by a non-existing word has different meanings, and thus different costs. In topic match as described herein, the costs of the two cases are different.

Positions of words may be part of the evaluation, e.g., if the query string can match with the topic string, then a match at the beginning and a match at the end of the query string should have different meanings. This may be realized with different costs, e.g., "Microsoft" matches "Microsoft news" versus "Microsoft" matches "working in Microsoft".

Different levels of match may have different costs for the same operations. For example, at the 'partial match (equivalent)' level, deleting a query word seldom occurs, and thus has a higher cost. In contrast, at the 'partial match (irrelevant)' level, deleting a query word is quite common, and thus the cost of deletion is lower. Note that topic match as described herein is designed for matching with topics and is based on an edit distance, while existing proximity models are designed for matching with fragments of text and are still based on a number of occurrences. Topic matching as described herein is thus complementary to other approaches, e.g., BM25 mainly resorts to a number of occurrences (i.e., term frequencies) in relevance calculation, instead of the order of words and other information described above. BM25 is thus suitable for using information from long texts, for example, whereas the while topic match technology is suitable for using information from short phrases, specifically, topics.

Figure 3:
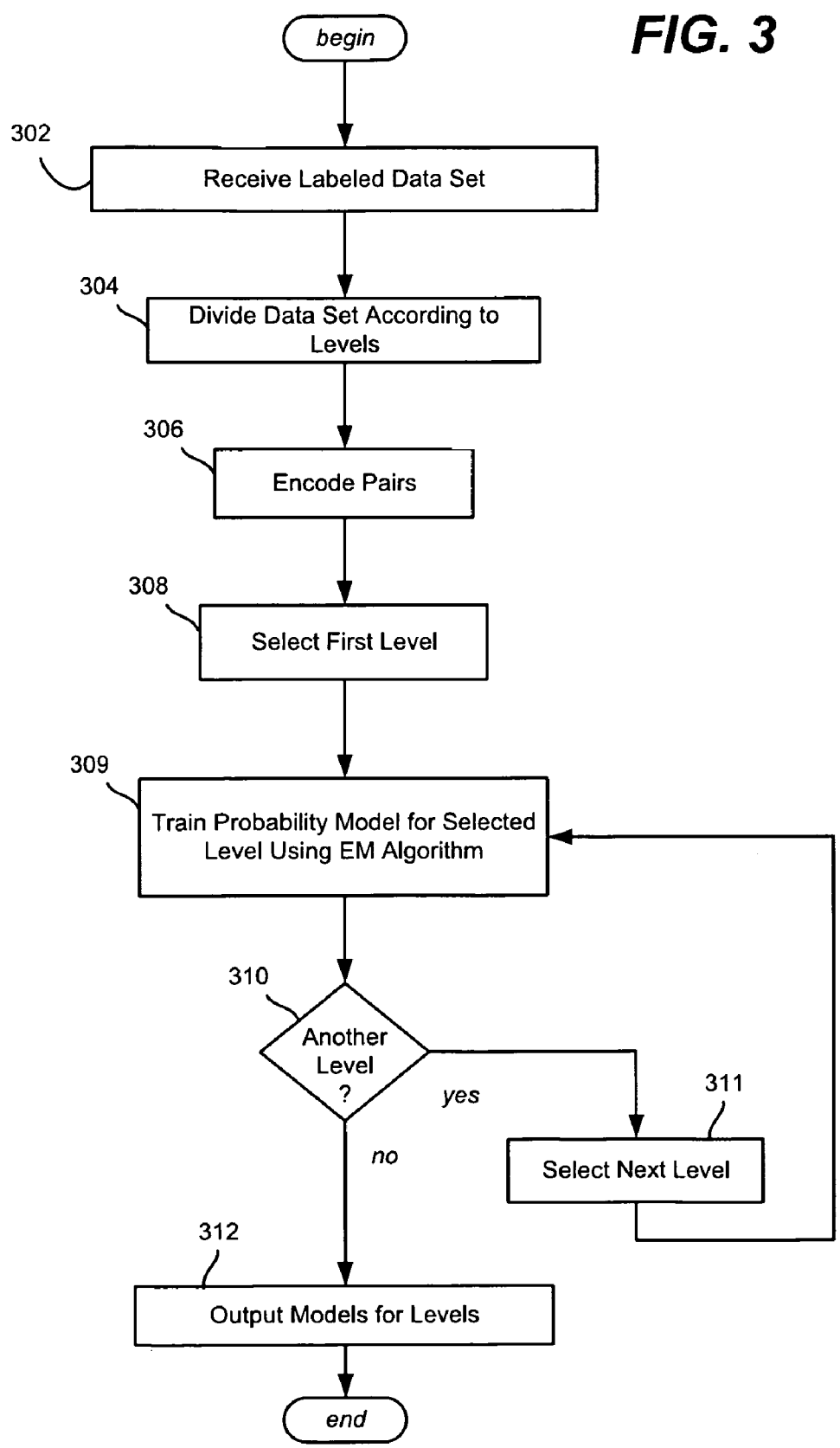
FIG. 3 is a flow diagram showing example steps taken by a learning algorithm used in training a topic-based relevance scoring method.

Turning to aspects related to training, also described herein is a supervised machine learning method to automatically train the model with parameters, as well as using the topic match method as a generic proximity model. To this end, labeled training data and an EM (Expectation Maximization) algorithm may be used. For the exactly match level and non-match level, the probability $P(L|Q \to T)$ may be defined directly. For the other three middle levels, $P(L|Q \to T)$ is calculated by means of machine learning. FIG. 3 generally represents a suitable learning algorithm, as also set forth below:

```
Input: A set of labeled data: <Q, T> → L_i; i = 1, . . . ,N.
                                                // (step 302)
1. Divide the data set according to levels      // (step 304)
2. Encode the <Q, T> pairs                      // (step 306)
3. for each level L_i do                        // steps 308-311
    Train probability model P(Q → T | L_i) using EM algorithm
    end for
Output: models for the levels.                  // (step 312)
```

Figure 4:
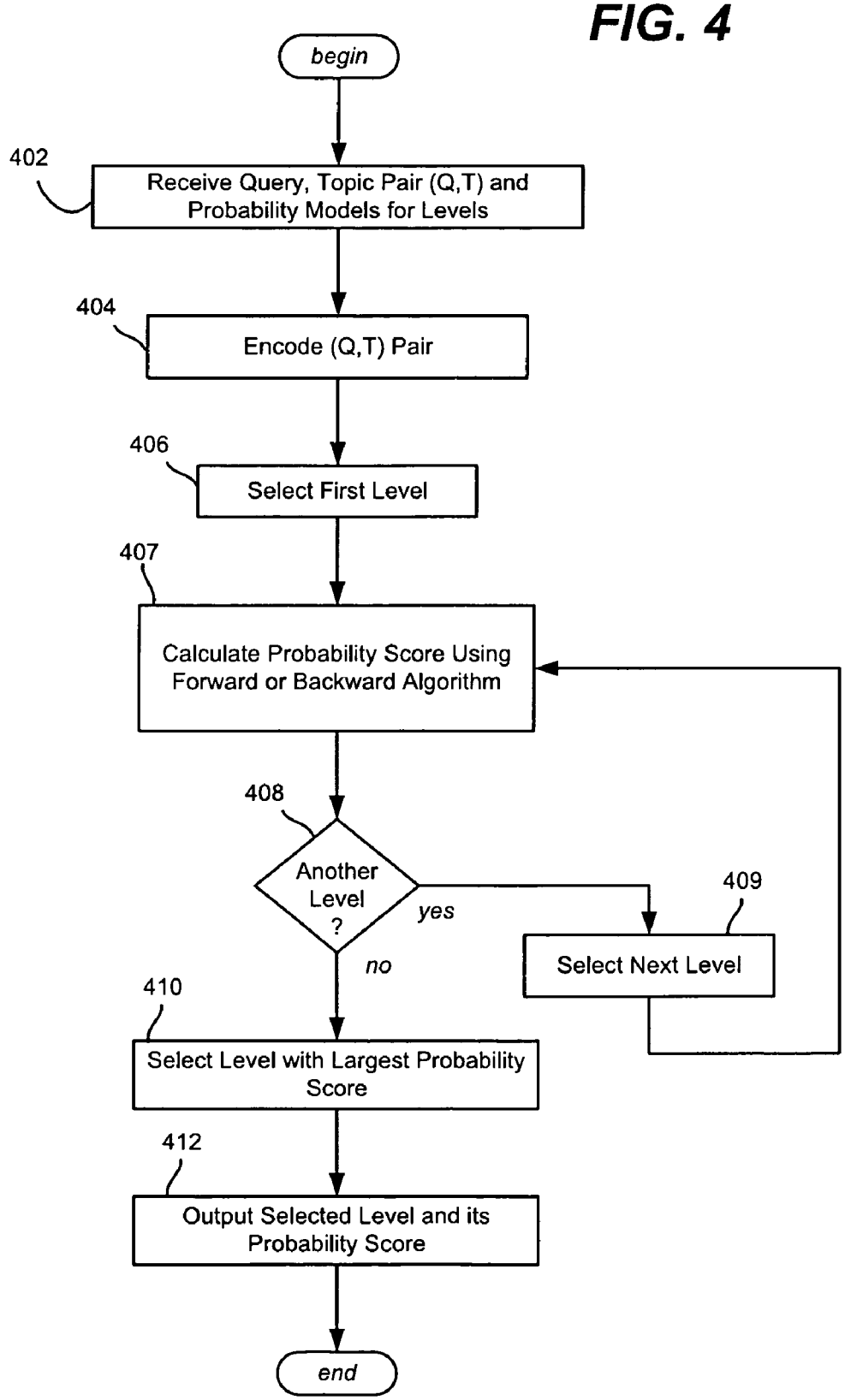
FIG. 4 is a flow diagram showing example steps taken by a prediction algorithm used in training a topic-based relevance scoring method

At each level, assume that training data comprising query and topic pairs is given $(Q_1, T_1), (Q_2, T_2), \ldots, (Q_N; T_N)$, and used to estimate the parameters of the conditional probability model $P(L|Q \to T)$. In prediction, given a new query and topic pair $(Q_{(N+1)}, T_{(N+1)})$, an algorithm (FIG. 4) calculates the probability of $P(Q_{(N+1)}, T_{(N+1)})$ using the model. FIG. 4 summarizes the prediction algorithm, as also set forth below:

```
Input: A pair of query-topic <Q, T> and probability models for the
levels                                          //step 402
1. Encode <Q, T> pair.                          //step 404
2. for each level L_i do                        //steps 406-409
    Calculate probability P(Q → T | L_i) using Forward or
    backward algorithm.
    end for
3. Select the level i with largest probability P(Q → T | L_i)
                                                // step 410
Output: selected level and its probability score. // step 4120
```

Note that $P(Q \to T|L)$ may be defined as a probability model with hidden variable S:

$$P(Q \to T \mid L) = \sum_S P(Q \to T, S \mid L) \qquad (2)$$

where S denotes a path in the Edit Distance model through which topic T can be generated from Q.

The model may be further decomposed by:

$$P(Q \to T, S \mid L) = \prod_{i=1}^{k} P(s_i \mid s_{i-1}) \qquad (3)$$

where $P(s_i|s_{(i-1)})$ denotes the probability of transiting to state $s_i$ given state $s_{i-1}$ in the path S. Furthermore, the probability can be expressed as a function of the cost in the following equation.

$$P(S_i|S_{i-1}) = \exp(-\lambda(S_i, S_{i-1})) \qquad (4)$$

where $\lambda(s_i; s_{i-1})$ denotes the cost for the transit from state $s_{i-1}$ to state $s_i$. Note that $\lambda$ represents the parameters which need to be estimated in training. In both training and prediction, the possible path S is hidden from the observations (Q,T).

Three issues thus arise, (1) how to calculate the probability $P(Q \to T|L)$ for a given pair (Q,L), (2) how to find the path S* whose probability $P(Q \to T|S^*,L)$ is the largest, and (3) how to estimate the parameters in $P(Q \to T|L)$ given training data. The problems are similar to those in the Hidden Markov Model or the Edit Distance model. And thus a Forward-Backward algorithm may be employed to calculate the probability $P(Q \to T|L)$, along with a Viterbi algorithm to find the best path, and an EM algorithm to estimate the parameters. Details of the training algorithm include:

Forward($x^T$, $y^V$)

1. $M^f_{0,0} = 1; D^f_{0,0} = 0; I^f_{0,0} = 0$

2. For i = 0 to T
3.    For j = 0 to V
4.       if (i > 0)
5.          idx\_i $\xleftarrow{map}$ $x_i$ 6.          $D^f_{i,j} = (p(idx\_i, \epsilon))[\sigma_D M^f_{i-1,j} + \delta_D D^f_{i-1,j} + \rho_D I^f_{i-1,j}]$ 7.       if (j > 0)
8.          idx\_i $\xleftarrow{map}$ $x_i$ 9.          idx\_j $\xleftarrow{map}$ $y_j$ 10.         $I^f_{i,j} = p(\langle \epsilon, idx\_j \rangle_{idx\_i})[\sigma_I M^f_{i,j-1} + \delta_I I^f_{i,j-1} + \rho_I I^f_{i,j-1}]$ 11.       if (i > 0 ∧ j > 0)
12.          if ($x_i = y_j$)
13.             $M^f_{i,j} = [\mu M^f_{i-1,j-1} + \gamma_I I^f_{i-1,j-1} + \gamma_D D^f_{i-1,j-1}]$ 14.          else
15.             $M^f_{i,j} = 0$ 16. $p(x^T, y^V) = \tau_\mu M^f_{T,V} + \tau_D D^f_{T,V} + \tau_I I^f_{T,V}$ 17. return $M^f, I^f, D^f, p(x^T, y^V)$ Backward($x^T$, $y^V$)

1. $M^b_{T,V} = \tau_\mu; D^f_{T,V} = \tau_D; I^f_{T,V} = \tau_I$

2. For i = T to 0
3.    For j = V to 0

4.       idx\_i $\xleftarrow{map}$ $x_{i+1}$ 5.       idx\_j $\xleftarrow{map}$ $y_{j+1}$ 6.       if (i < T)

| | Backward($x^T$, $y^V$) |
|---|---|
| 7. | $D^b_{i,j} = p(\langle idx\_i, \epsilon \rangle)\delta_D D^b_{i+1,j}$ |
| 8. | $M^b_{i,j} = p(\langle idx\_i, \epsilon \rangle)\sigma_D D^b_{i+1,j}$ |
| 9. | $I^b_{i,j} = p(\langle idx\_i, \epsilon \rangle)\rho_D D^b_{i+1,j}$ |
| 10. | if ($j < V$) |
| 11. | $I^b_{i,j} \mathrel{+}= p(\langle \epsilon, idx\_j \rangle_{idx\_i})\delta_I I^b_{i,j+1}$ |
| 12. | $M^b_{i,j} \mathrel{+}= p(\langle \epsilon, idx\_j \rangle_{idx\_i})\sigma_I I^b_{i,j+1}$ |
| 13. | $D^b_{i,j} \mathrel{+}= p(\langle \epsilon, idx\_j \rangle_{idx\_i})\rho_I I^b_{i,j+1}$ |
| 14. | if ($i < T \land j < V$) |
| 15. | if ($x_{i+1} = y_{j+1}$) |
| 16. | $D^b_{i,j} \mathrel{+}= \gamma_D M^b_{i+1,j+1}$ |
| 17. | $I^b_{i,j} \mathrel{+}= \gamma_I M^b_{i+1,j+1}$ |
| 18. | $M^b_{i,j} \mathrel{+}= \mu M^b_{i+1,j+1}$ |
| 19. | $p(x^T, y^V) = M^b_{0,0}$ |
| 20. | Return $M^b, I^b, D^b, p(x^T, y^V)$ |

| | EXPECTATION-STEP(($x^T$, $y^V$)) |
|---|---|
| 1. | $(M^f, D^f, I^f, p(x^T, y^V)) = \text{Forward}(x^T, y^V)$ |
| 2. | $(M^b, D^b, I^b, p(x^T, y^V)) = \text{Backward}(x^T, y^V)$ |
| 3. | for $i = 0$ to $T$ |
| 4. | for $j = 0$ to $V$ |
| 5. | if ($i > 0$) |
| 6. | $idx\_i \xleftarrow{map} x_i$ |
| 7. | $\xi_{\sigma_D} = \dfrac{M^f_{i-1,j} * \sigma_D * p(\langle idx\_i, \epsilon \rangle) * D^b_{i,j}}{p(x^T, y^V)}$ |
| 8. | $E[\sigma_D] \mathrel{+}= \xi_{\sigma_D}; E[\langle idx\_i, \epsilon \rangle] \mathrel{+}= \xi_{\sigma_D}$ |
| 9. | $\xi_{\delta_D} = \dfrac{D^f_{i-1,j} * \delta_D * p(\langle idx\_i, \epsilon \rangle) * D^b_{i,j}}{p(x^T, y^V)}$ |
| 10. | $E[\delta_D] \mathrel{+}= \xi_{\delta_D}; E[\langle idx\_i, \epsilon \rangle] \mathrel{+}= \xi_{\delta_D}$ |
| 11. | $\xi_{\rho_D} = \dfrac{I^f_{i-1,j} * \rho_D * p(\langle idx\_i, \epsilon \rangle) * D^b_{i,j}}{p(x^T, y^V)}$ |
| 12. | $E[\rho_D] \mathrel{+}= \xi_{\rho_D}; E[\langle idx\_i, \epsilon \rangle] \mathrel{+}= \xi_{\rho_D}$ |
| 13. | if ($j > 0$) |
| 14. | $idx\_i \xleftarrow{map} x_i$ |
| 15. | $idx\_j \xleftarrow{map} y_j$ |

| | EXPECTATION-STEP(($x^T$, $y^V$)) |
|---|---|
| 16. | $\xi_{\sigma_I} = \dfrac{M^f_{i,j-1} * \sigma_I * p(\langle \epsilon, idx\_j \rangle_{idx\_i}) * I^b_{i,j}}{p(x^T, y^V)}$ |
| 17. | $E[\sigma_I] \mathrel{+}= \xi_{\sigma_I}; E[\langle \epsilon, idx\_j \rangle_{idx\_i}] \mathrel{+}= \xi_{\sigma_I}$ |
| 18. | $\xi_{\delta_I} = \dfrac{I^f_{i,j-1} * \delta_I * p(\langle \epsilon, idx\_j \rangle_{idx\_i}) * I^b_{i,j}}{p(x^T, y^V)}$ |
| 19. | $E[\delta_I] \mathrel{+}= \xi_{\delta_I}; E[\langle \epsilon, y_j \rangle_{idx\_i}] \mathrel{+}= \xi_{\delta_I}$ |
| 20. | $\xi_{\rho_I} = \dfrac{D^f_{i,j-1} * \rho_I * p(\langle \epsilon, idx\_j \rangle_{idx\_i}) * I^b_{i,j}}{p(x^T, y^V)}$ |
| 21. | $E[\rho_I] \mathrel{+}= \xi_{\rho_I}; E[\langle \epsilon, idx\_j \rangle_{idx\_i}] \mathrel{+}= \xi_{\rho_I}$ |
| 22. | if ($i > 0 \land j > 0$) |
| 23. | if ($x_i = y_j$) |
| 24. | $\xi_\mu = \dfrac{M^f_{i-1,j-1} * \mu * M^b_{i,j}}{p(x^T, y^V)}$ |
| 25. | $E[\mu] \mathrel{+}= \xi_\mu$ |
| 26. | $\xi_{\gamma_I} = \dfrac{I^f_{i-1,j-1} * \gamma_I * M^b_{i,j}}{p(x^T, y^V)}$ |
| 27. | $E[\gamma_I] \mathrel{+}= \xi_{\gamma_I}$ |
| 28. | $\xi_{\gamma_D} = \dfrac{D^f_{i-1,j-1} * \gamma_D * M^b_{i,j}}{p(x^T, y^V)}$ |
| 29. | $E[\gamma_D] \mathrel{+}= \xi_{\gamma_D}$ |
| 30. | $E[\tau_\mu] \mathrel{+}= 1; E[\tau_D] \mathrel{+}= 1; E[\tau_I] \mathrel{+}= 1$ |

Figure 5:
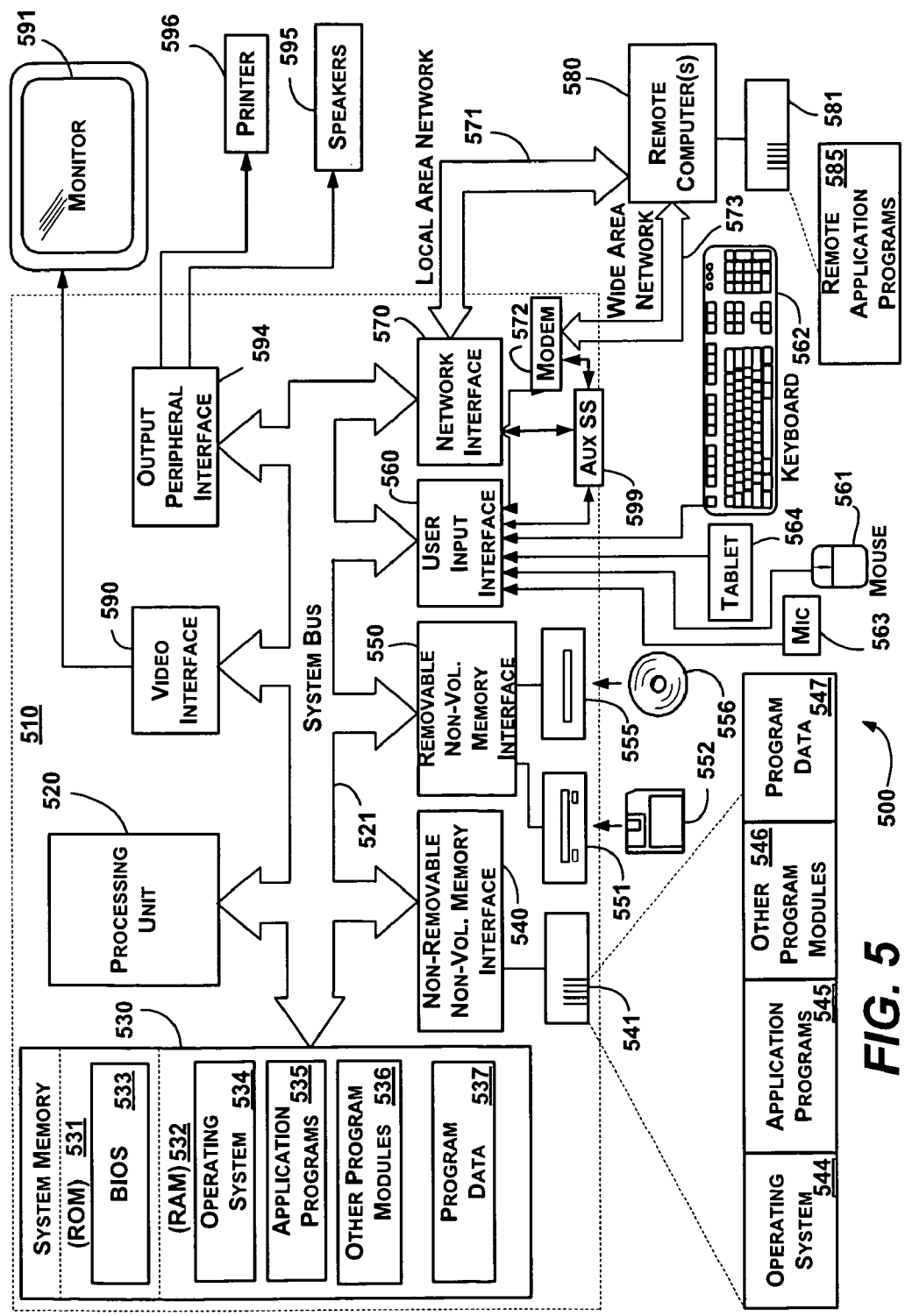
FIG. 5 shows an illustrative example of a computing environment into which various aspects of the present invention may be incorporated.

MAXIMIZATION( )
1. $N_M = E[\mu] + E[\sigma_I] + E[\sigma_D] + E[\tau_\mu]$
2. $\mu = E[\mu]/N_M; \sigma_I = E[\sigma_I]/N_M; \sigma_D = E[\sigma_D]/N_M; \tau_\mu = E[\tau_\mu]/N_M$
3. $N_I = E[\delta_I] + E[\gamma_I] + E[\rho_D] + E[\tau_I]$
4. $\delta_I = E[\delta_I]/N_I; \gamma_I = E[\gamma_I]/N_I; \rho_D = E[\rho_D]/N_I; \tau_I = E[\tau_I]/N_I;$
5. $N_D = E[\delta_D] + E[\gamma_D] + E[\rho_I] + E[\tau_D]$
6. $\delta_D = E[\delta_D]/N_D; \gamma_D = E[\gamma_D]/N_D; \rho_I = E[\rho_I]/N_D; \tau_D = E[\tau_D]/N_D$
7. For all $\langle \epsilon, idx\_j \rangle_{idx\_i}$
8.    $N_I' \mathrel{+}= E[\langle \epsilon, idx\_j \rangle_{idx\_i}]$
9. For all $\langle idx\_i, \epsilon \rangle$
10.    $N_D' \mathrel{+}= E[\langle idx\_i, \epsilon \rangle]$
11.    For each $\langle \epsilon, a \rangle_i$
12.    $p(\langle \epsilon, idx\_j \rangle_{idx\_i}) = E[\langle \epsilon, idx\_j \rangle_{idx\_i}]/N_I'$
13.    For each $\langle a, \epsilon \rangle$
14.    $p(\langle idx\_i, \epsilon \rangle) = E[\langle idx\_i, \epsilon \rangle]/N_D'$ E–M($\{(x^{T_1}, y^{V_1}), \ldots, (x^{T_n}, y^{V_n})\}$)
until convergence
  for $i = 0$ to $n$
    E-STEP(($x^{T_i}, y^{V_i}$))
  M-STEP
Output the parameters of the model Exemplary Operating Environment FIG. 5 illustrates an example of a suitable computing and networking environment 500 on which the examples of FIGS. 1-4 may be implemented. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 5, an exemplary system for implementing various aspects of the invention may include a general purpose computing device in the form of a computer 510. Components of the computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 510 typically includes a variety of computer-readable media. Computer-readable media can be any available media that can be accessed by the computer 510 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 510. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536 and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media, described above and illustrated in FIG. 5, provide storage of computer-readable instructions, data structures, program modules and other data for the computer 510. In FIG. 5, for example, hard disk drive 541 is illustrated as storing operating system 544, application programs 545, other program modules 546 and program data 547. Note that these components can either be the same as or different from operating system 534, application programs 535, other program modules 536, and program data 537. Operating system 544, application programs 545, other program modules 546, and program data 547 are given different numbers herein to illustrate that, at a minimum, they are different copies. A user may enter commands and information into the computer 510 through input devices such as a tablet, or electronic digitizer, 564, a microphone 563, a keyboard 562 and pointing device 561, commonly referred to as mouse, trackball or touch pad. Other input devices not shown in FIG. 5 may include a joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. The monitor 591 may also be integrated with a touch-screen panel or the like. Note that the monitor and/or touch screen panel can be physically coupled to a housing in which the computing device 510 is incorporated, such as in a tablet-type personal computer. In addition, computers such as the computing device 510 may also include other peripheral output devices such as speakers 595 and printer 596, which may be connected through an output peripheral interface 594 or the like.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include one or more local area networks (LAN) 571 and one or more wide area networks (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560 or other appropriate mechanism. A wireless networking component 574 such as comprising an interface and antenna may be coupled through a suitable device such as an access point or peer computer to a WAN or LAN. In a networked environment, program modules depicted relative to the computer 510, or portions thereof, may be stored in the remote memory storage device. By way of example, and not limitation, FIG. 5 illustrates remote application programs 585 as residing on memory device 581. It may be appreciated that the network connections shown are exemplary and other means of establishing a communications link between the computers may be used.

An auxiliary subsystem 599 (e.g., for auxiliary display of content) may be connected via the user interface 560 to allow data such as program content, system status and event notifications to be provided to the user, even if the main portions of the computer system are in a low power state. The auxiliary subsystem 599 may be connected to the modem 572 and/or network interface 570 to allow communication between these systems while the main processing unit 520 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
 extracting, by a computer, topics from a web page of a set of web pages that correspond to a query, wherein the topics are noun phrases that represent subjects of the web page; and
 computing, by the computer, a relevance score for each extracted topic, wherein each relevance score is based on a predicted match level from a group of match levels comprising a first match level that indicates an exact match between the each extracted topic and the query, a second match level that indicates a same meaning between the each extracted topic and the query, a third match level that indicates that the each extracted topic is relevant to the query, a fourth match level that indicates that the each extracted topic is irrelevant to the query, and a fifth match level that indicates that the each extracted topic does not match the query, and wherein the predicted match level is based on a conditional probability model $P(L|Q \rightarrow T)$ where L denotes a level, and where $Q \rightarrow T$ denotes an event that comprises generating topic T from query Q.

2. The method of claim 1 wherein the extracting is from at least one of a group comprising a title of the web page, anchor text of the web page, a uniform resource locator ("URL") referencing the web page, tags assigned to the web page, a query associated with the web page, and a body of the web page.

3. The method of claim 2 wherein the computing comprises determining a first score for the title, determining a second score for at least at least a portion of the anchor text, and determining a third score for the URL.

4. The method of claim 3 wherein the computing comprises combining the first score and the second score and third score into a final score.

5. The method of claim 4 further comprising:
 extracting other topics from other web pages that are distinct from the web page;
 computing relevance scores for the extracted other topics;
 determining another relevance score based on another predicted match level for each extracted other topic relative to the query; and
 ranking the web page and each of the other web pages based on their respective relevance scores.

6. The method of claim 5 wherein the ranking is further based on probability data computed for the web page and the each of the other web pages.

7. The method of claim 6 further comprising, providing an edit distance model for each of the group of match levels.

8. The method of claim 7 further comprising, training the edit distance model using a learning algorithm and a prediction algorithm.

9. The method of claim 7 wherein the ranking comprises encoding the query and each extracted topic and each extracted other topic.

10. In a computing environment, a system comprising:
 a computer;
 a topic identification mechanism implemented at least in part by the computer and configured for extracting topics from a set of web pages that correspond to a query, wherein the topics are noun phrases that represent subjects of the web pages;
 a topic match mechanism implemented at least in part by the computer and coupled to the topic identification mechanism and configured for computing a relevance score for each extracted topic, wherein each relevance score is based on a predicted match level from a group of match levels comprising a first match level that indicates an exact match between the each extracted topic and the query, a second match level that indicates a same meaning between the each extracted topic and the query, a third match level that indicates that the each extracted topic is relevant to the query, a fourth match level that indicates that the each extracted topic is irrelevant to the query, and a fifth match level that indicates that the each extracted topic does not match the query, and wherein the predicted match level is based on a conditional probability model $P(L|Q \rightarrow T)$ where L denotes a level, and where $Q \rightarrow T$ denotes an event that comprises generating topic T from query Q; and a page ordering mechanism implemented at least in part by the computer and coupled to the topic match mechanism and configured for ranking the web pages relative to one another based on the relevance score computed for each web page.

11. The system of claim 10 wherein the topic identification mechanism is further configured for extracting topics from at least one of a group comprising a title of the web page, anchor text of the web page, a uniform resource locator ("URL") referencing the web page, tags assigned to the web page, a query associated with the web page, and a body of the web page.

12. The system of claim 11 wherein the computing comprises determining a first score for the title, determining a second score for at least at least a portion of the anchor text, and determining a third score for the URL.

13. The system of claim 12 wherein the computing comprises combining the first score and the second score and third score into a final score.

14. At least one computer storage medium having computer-executable instructions that, when executed by a computer, cause the computer to perform a method comprising:

extracting topics from each web page of a set of web pages that correspond to a query, wherein the topics are noun phrases that represent subjects of the web pages;

computing a relevance score for each extracted topic, wherein each relevance score is based on a predicted match level from a group of match levels comprising a first match level that indicates an exact match between the each extracted topic and the query, a second match level that indicates a same meaning between the each extracted topic and the query, a third match level that indicates that the each extracted topic is relevant to the query, a fourth match level that indicates that the each extracted topic is irrelevant to the query, and a fifth match level that indicates that the each extracted topic does not match the query, and wherein the predicted match level is based on a conditional probability model $P(L|Q \rightarrow T)$ where L denotes a level, and where $Q \rightarrow T$ denotes an event that comprises generating topic T from query Q; and ranking the web pages relative to one another based on the computed relevance scores.

15. The at least one computer storage medium of claim 14 wherein the extracting is from at least one of a group comprising a title of the web page, anchor text of the web page, a uniform resource locator ("URL") referencing the web page, tags assigned to the web page, a query associated with the web page, and a body of the web page.

16. The at least one computer storage medium of claim 14 wherein the ranking is further based on probability data computed for the web pages.

* * * * *